(12) United States Patent
Staver et al.

(10) Patent No.: US 9,036,262 B2
(45) Date of Patent: May 19, 2015

(54) BEAM SHAPING AND CONTROL APPARATUS

(75) Inventors: Philip R. Staver, Wilton, NH (US); Michael J. Shaw, Concord, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 115 days.

(21) Appl. No.: 13/825,213

(22) PCT Filed: Jul. 4, 2012

(86) PCT No.: PCT/US2012/045472
§ 371 (c)(1),
(2), (4) Date: Mar. 20, 2013

(87) PCT Pub. No.: WO2013/009550
PCT Pub. Date: Jan. 17, 2013

(65) Prior Publication Data
US 2013/0182332 A1 Jul. 18, 2013

Related U.S. Application Data

(60) Provisional application No. 61/507,172, filed on Jul. 13, 2011.

(51) Int. Cl.
*G02B 27/10* (2006.01)
*G02B 27/09* (2006.01)

(52) U.S. Cl.
CPC .................. *G02B 27/0905* (2013.01)

(58) Field of Classification Search
USPC ................................ 359/618–623
See application file for complete search history.

(56) References Cited

U.S. PATENT DOCUMENTS

| 5,900,980 | A | * | 5/1999 | Yamazaki et al. | 359/619 |
| 5,946,138 | A | * | 8/1999 | Mizouchi | 359/618 |
| 6,246,524 | B1 | * | 6/2001 | Tanaka | 359/619 |
| 6,639,728 | B2 | * | 10/2003 | Murra et al. | 359/623 |
| 6,909,854 | B1 | | 6/2005 | Kleiner et al. | |
| 2002/0181102 | A1 | | 12/2002 | Leyva et al. | |
| 2002/0196534 | A1 | | 12/2002 | Lizotte et al. | |
| 2005/0157762 | A1 | | 7/2005 | DeMaria et al. | |

FOREIGN PATENT DOCUMENTS

KR   10-2003-0007394   1/2003

* cited by examiner

*Primary Examiner* — Mohammed Hasan
(74) *Attorney, Agent, or Firm* — Daniel J. Long; Joseph E. Funk

(57) ABSTRACT

A method and apparatus for laser beam splitting and shaping is disclosed wherein two beam splitters are used to split one input laser beam into four beams in a generally rectangular pattern. Half-wave plates are used to adjust the power of the input laser beam between the four laser beams. A variable power optical telescope comprising negative and positive lens pairs for the four laser beams is used to adjust the divergence of the four beams, and pointing control prism wedges are used to point or steer the four beams to be parallel to each other and to adjust their relative spacing to create a flat top profile.

21 Claims, 4 Drawing Sheets

(Top View)

$$\Theta_{\text{full-angle separation}} = (S/f_2) \div (1 - f_2/x)$$

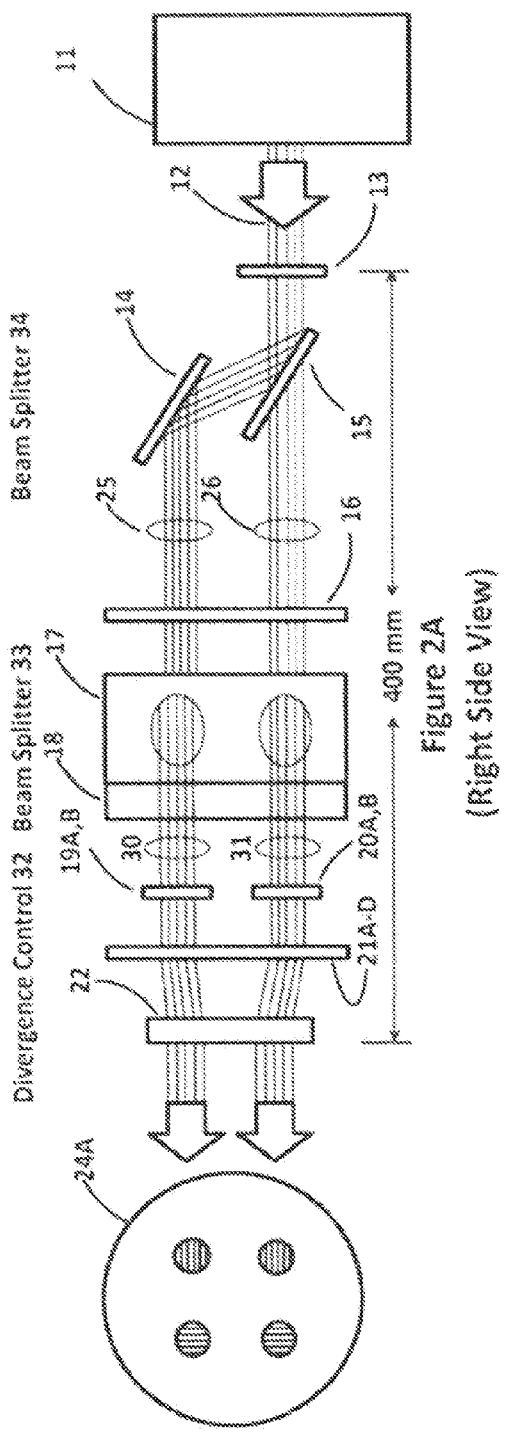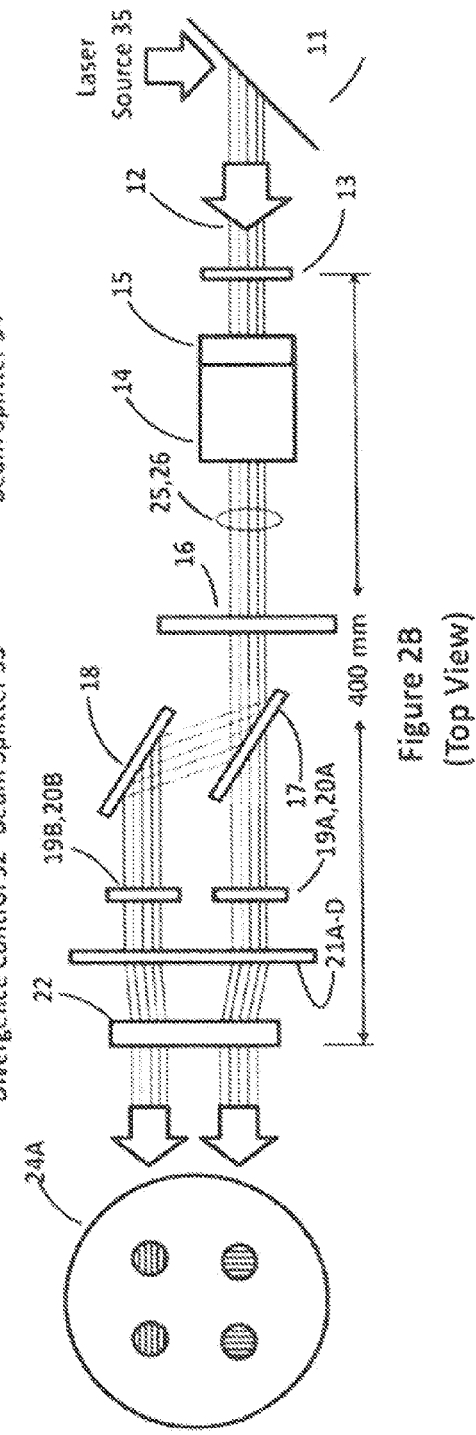

BEAM SHAPING AND CONTROL APPARATUS

RELATED APPLICATIONS

This application claims the benefit of U.S. Provisional Application 61/507,172 filed Jul. 13, 2011, which is incorporated herein in its entirety by reference.

STATEMENT OF GOVERNMENT INTEREST

The invention was made with United States Government assistance under contract number 09-C-8656 awarded by a classified customer. The United States Government has certain rights in the invention.

FIELD OF THE INVENTION

The present invention relates to optical beam forming, and specifically to a laser beam splitting and shaping system.

BACKGROUND OF THE INVENTION

Laser sources are frequently used to illuminate subjects of interest and laser energy reflected therefrom is received by imaging sensors which employ signal and image processing algorithms to identify targets or other features of interest found in an image recorded by a focal plane detector.

The efficiency and sensitivity of these signal and image processing algorithms are significantly dependent on the spatial characteristics of the laser source illuminating a subject of interest. Therefore, by controlling the spatial characteristics of the laser source illuminating the subject of interest, the efficiency and sensitivity of the imaging processing algorithms can be substantially improved. Using lens pairs for divergence control and four sets of 2-axis pointing mirrors, or four sets of Risley prism pairs (for pointing control) in order to independently steer each of the four different laser beams is well known. Each, of these lenses, mirrors and prisms generally require mechanical mounting hardware and electronic control systems to control the positioning of these devices. Thus, overall, these devices and systems are complex and a simpler design is needed.

Normally, the spatial profile of a beam from a conventional laser device is characterized by a Gaussian cross-section, However, for many applications a more favorable profile of a laser beam is a flat-top profile. In order to convert a perfect Gaussian profile into a perfect flat-top profile an optical system with considerable complexity is usually required.

A need therefore exists in the art for an optical system that can perform the laser beam split and recombine function with a minimum of optical components and less complexity. Moreover, because the distance from the laser source to the target of interest may be variable, a need also exists for a system to adjust the divergence of the laser source, and the relative overlap of the laser beams as they are emitted from an illumination system to provide a beam with a flat-top profile.

SUMMARY OF THE INVENTION

The present invention satisfies the need in the prior art. A relatively simple optical system and method are disclosed which first splits a laser beam from a single laser source into two separate laser beams, then splits each of these two laser beams into two laser beams for a total of four laser beams. The divergence and pointing of the final resulting four beams are then controlled to allow them to be spatially recombined in an overlapping manner that overlaps the four beams into a single, rectangular profile that has a flat-top profile rather than a Gaussian profile.

It is desirable to have a relatively simple optical system that can perform the laser beam splitting and recombination function to mate a flat-top profile with a minimum of optical components. Moreover, because the distance from the laser source to a target of interest may be variable, it is desirable to be able to adjust the divergence of the four laser beams, and the relative overlap of the four laser beams, as they are emitted from the novel optical system. in addition, the relative power in each of the four output beams can he adjusted.

In a first embodiment of the invention, an input laser beam is directed into a first beam splitting device that first vertically splits the beam into two laser beams. Each of these two laser beams is then split horizontally by a second beam splitting device into two more laser beams to form a rectangular pattern of the resulting four laser beams. Each of these four laser beams is then directed individually into a focusing lens, and then onward toward a common, diverging, negative powered lens.

Four prism wedges are interspersed between the four focusing lenses and the common diverging lens for pointing control so that the four laser beams are pointed toward the virtual focal point of the diverging lens while being parallel to each other with the relative spacing between the four beams being predetermined. In the first embodiment of the invention the divergence of the four laser beams is controlled by adjusting the horizontal position or spacing between the four focusing lenses and the common diverging lens. The pointing of the four laser beams is controlled by adjusting the position of the prism wedges orate pointing control between the focusing lenses and the diverging lens. In addition to providing pointing control with the four prism wedges and divergence control with the negative and positive lenses, these optical elements may include half-wave plates that can alter the polarization of the transmitted light. These half-wave plates also provide beam control to vary the relative power in each of the four laser beams. This is done by placing half-wave plates before each of the optical elements that perform the beam splitting operations.

In a variant of the invention, the first input laser beam is first split into two laser beams horizontally by a first beam splitter, and then each or these two laser beams is split vertically by a second beam splitter into two laser beams, for a total of four laser beams. In another variant of the invention, the second beam splitter splits the two beams simultaneously with the same optical element. In yet another variant of the invention the four individual prisms of the pointing control can be replaced by a single pyramid-shaped prism, in which four prisms are fabricated out of a single piece of optical material.

The pointing optics guides the four laser beams to be parallel to each another and determines their relative spacing. The pointing optic for each of the four beamlets is typically a prism wedge positioned between the positive lens and the negative lens mentioned in the previous paragraph and the pointing of the four laser beams is controlled by moving its associated prism wedge along the optical axis of the system.

DESCRIPTION OF THE DRAWINGS

The invention will be better understood upon reading the following Detailed Description in conjunction with the drawing in which;

FIG. 2A is a side view of the beam splitting and shaping system of the present invention;

FIG. 2B is a top view of the beam splitting and shaping system of the present invention;

DETAILED DESCRIPTION

Figures 1, 3:
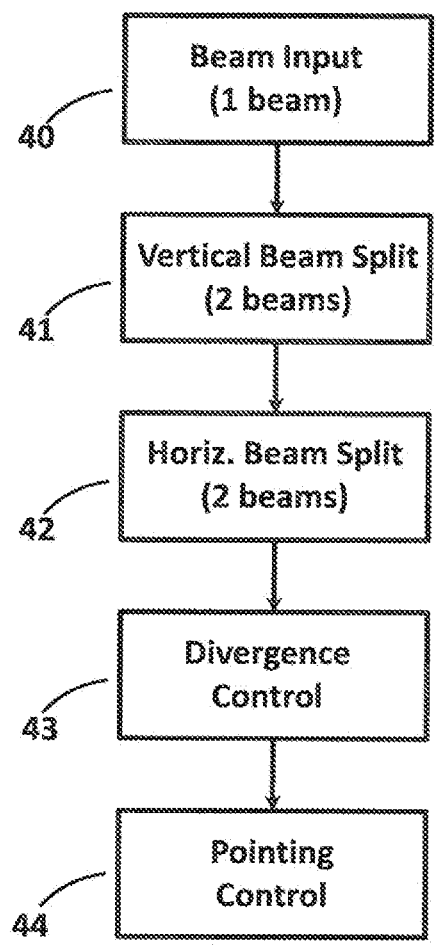
FIG. 1 is a block diagram of the method steps performed by the beam splitting and shaping system of the present invention.
FIG. 3 is an equation showing the relationship between the pointing angle and the optical configuration of the prism wedges 21A-D in the pointing control.
Figure 6:
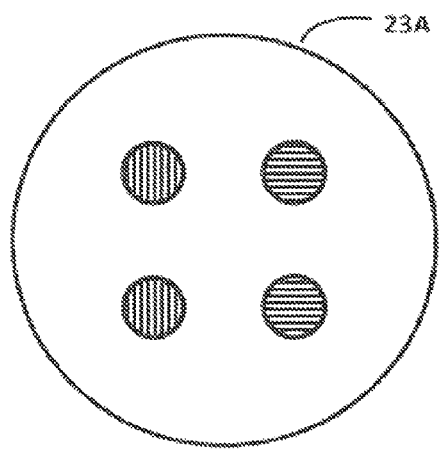
FIG. 6 shows a representative pattern of the four laser beams output from the beam splitting and shaping system of the present invention before any adjustments are made.

In FIG. 1 is shown a block diagram of the method steps performed by the beam splitting and shaping system of the present invention in a very brief form to describe the method steps involved and generally how they are linked to the optical hardware that comprises the invention. In block 40 is represented a single laser beam being input to the apparatus from a laser source 35 as shown in FIG. 2B. The laser beam is reflected off a mirror 11 and passes through a half-wave plate 13 shown in both FIGS. 2A and 2B. In block 41 the single laser beam from laser source 35 is split vertically into two beams by a beam splitter 34 as shown in FIGS. 2A and 2B. One of the two last mentioned laser beams passes through first polarizer 15, which is part of beam splitter 34, and then passes through a half-wave plate 16. The other of the two last mentioned laser beams reflects off polarizer 15, then off mirror 14 and then passes through the half-wave plate 16. In block 42 is horizontal beam splitter 33 where the laser beam from each of mirror 14 and polarizer 15 are each split again so there are four beams output from horizontal beam splitter 33. In block 43 each of the four laser beams output from beam splitter 33 passes through its own positive lens (one of lenses 19A,B and 20A,B) of divergence control 32. In block 44 laser beam pointing control is accomplished by a group of four prism wedges P1, one wedge for each of the four laser beams, and then the four beams pass through a common negative lens 22. The lenses 19A,B, 20A,B, and 22 act as a variable power telescope that control the divergence of each of the our laser beams leaving the exit aperture of negative lens 22. The power is varied by moving lenses 19A,B and 20A,B (individually or together as a group, as necessary) closer to or further away from lens 22. More particularly, this controls the divergence of the four beamlets exiting common lens 22 to space the beamlets such as shown in FIG. 6 versus FIG. 7. Stated another way, the divergence control 19A,B, 20A,B, 22 and pointing control prism wedges 21A-D provide the ability to adjust the size and relative positions of the four output beamlets as shown in FIGS. 6-9.

FIG. 2A is a right side view of the beam splitting and shaping apparatus of the present invention, and FIG. 2B is a top view of the beam splitting and shaping apparatus of the present invention. Very briefly, the components in FIGS. 2A and 2B split a single laser beam 12 into four separate beams (also referred herein as beamlets) which are subsequently recombined in a spaced manner and spatially overlapped. The relative power in each of the four output beamlets can be adjusted, the divergence of the four beamlets can be adjusted, and the relative spacing of the four beamlets can also be adjusted as shown in FIGS. 6 through 9, so that the four separate beamlets that are spatially recombined in a manner that overlaps them into a single, rectangular, flat-top profile as shown in FIG. 9. In this configuration, the beams are first split in the vertical direction, and then in the horizontal direction. Alternately, the input laser beam 12 first could be split horizontally, and then vertically. More particularly, the first half-wave plate 13 acts as a power control, when rotated azimuthally, and controls the relative fraction of the power of beam 12 contained in the upper beam 25 and the lower beam 26. The second wave-plate 16 controls the relative fraction of beam power between the left and right beamlet pairs output from beam splitter 33.

The beam splitting and shaping system comprises two thin film polarizers 15 and 17, two highly reflective mirrors 14 and 18, two half wave plates 13 and 16, four prism wedges 21A-D for pointing control, and a divergence control 32 comprising four positive plano-convex lenses 19A,B and 20A,B and one negative plano-concave lens 22. Each of lenses 19A,B and 20A,B are +200 millimeter lenses and lens 22 is a −115 millimeter lens. The four, thin prism wedges 21A-D each have a wedge angle of approximately 2 degrees. The distance between half-wave plate 13 and plano-concave lens 22 is 400 millimeters.

A laser source 35 (not shown in FIG. 2A but shown in FIG. 2B) reflects off the far side of mirror 11 positioned at forty-five degrees, and then passes through beam splitting optics 34 and 33 for splitting laser beam 12 both vertically and horizontally into four beams (beamlets). Alternatively, laser beam 12 may be input directly without a mirror 11. The splitting of laser beam 12 may be accomplished in either order. That is, vertical splitting followed by horizontal splitting (as shown) or, alternatively, horizontal splitting followed vertical splitting.

As shown, laser beam 12 first passes through a half wave plate 13 for power control, then impinges on thin film polarizer plate 15 of beam splitter 34 which splits beam 12 into two beams (beamlets), one beamlet 26 of which passes through plate 15 and impinges on half wave plate 16. The other beamlet 25 reflects off plate 15, then reflects off highly reflective mirror 14 and impinges on half wave plate 16. Half-wave plate 13 acts as a power control, that when rotated azimuthally, controls the relative fraction of the power of laser beam 12 contained in the upper and lower beams 25 and 26.

The two beamlets 25, 26, one reflected respectively from mirror 14 and the other passing through thin film polarizer plate 15, pass through half wave plate 16 and impinge on a horizontal beam splitter 33. Half wave plate 16, when rotated azimuthally, controls the relative fraction of the power of the laser beam between the left and right beamlet pairs output from beam splitter 33. Horizontal beam splitter 33 splits each of these two beamlets 25 and 26 horizontally into two beamlets, for a total of four beamlets. This is better seen in conjunction with FIG. 2B. The two beamlets 25, 26 passing through half wave plate 16 impinge on a thin film polarizer plate 17 which splits each of the two beamlets 25, 26 into two beamlets, for a total of four beamlets.

One of the two beamlets created from beamlet 25 passes through polarizer plate 17 and impinges on a plano-convex lens 20A, while the other of the two beamlets created from beamlet 25 reflects off polarizer plate 17, reflects off mirror 18 and impinges on a plano-convex lens 19A. Similarly, one of the two beamlets created from beamlet 26 passes through polarizer plate 17 and impinges on a plano-convex lens 20B, while the other of the two beamlets created from beamlet 26 reflects off plate 17 and reflects off mirror 18 and impinges on a plano-convex lens 19B. Lenses 19A,B and 20A,B are part of the divergence control 32 which, along with plano-concave lens 22 make up a positive and negative lens pair that create a variable power telescope. The power is varied by moving lenses 19A,B and 20A,B (individually as necessary) closer to or further away from lens 22. More particularly, this controls the divergence of the four beamlets exiting common lens 22 to space the beamlets further part, such as shown in FIG. 6 versus FIG. 7. In an alternate embodiment of the invention other lens types could be utilized that create a variable power telescope.

The four beamlets each pass through an associated one of the four plano-convex lens 19A,B and 20A,B and then each passes through a dedicated one of prism wedges 21A-D, That is, the beamlet passing through lens 19A passes through prism 21A, the beamlet passing through lens 19B passes through prism 21B, the beamlet passing through lens 20A passes through prism 21C and the beamlet passing through lens 20B passes through prism 21D. Beam pointing is accomplished using prism wedges 21A-D. Each of lenses 19A,B and 20A,B have focal length values of +200 millimeters and lens 22 has a focal length value of −115 millimeters.

In the preferred embodiment of the invention described herein each of the four prism wedges 21A-D has a wedge angle of approximately 2 degrees and is a four sided pyramid that are all oriented in a manner to direct each of the four beamlets towards the rear, virtual focal plane of the negative lens 22. The result is that the four beamlets emerging from the four prism wedges 21A-D are parallel to each other, as they are directed into the far-field. Pointing the beams, that is adjusting their relative angular separation, is accomplished by translating the array of the four prisms 21A-D longitudinally between lenses 19A,B and 20A,B and the common, negative lens 22.

The four beamlets exiting prism wedges 21A-D all pass through a common plano-concave lens 22 that has a focal length of −115 millimeters and the four beamlets appear as shown in circle 24A. The lenses 19A,B, 20A,B cooperate with lens 22 to act as a variable power telescope that controls the divergence of the four laser beamlets leaving the exit aperture of negative leas 22. This is best seen m FIGS. 6 and 7.

Although the thin-film polarizers 15, 17 and the half-wave plate components 13, 16 provide the ability to arbitrarily adjust the relative power in the four emitted beams (and allow for adjustment during continuous operation), an alternate embodiment of this invention exists in which the thin-film polarizers are replaced by beam splitters having a preset beam splitting fraction, so that the relative brightness of the transmitted and reflected beams is fixed at a constant value. In this embodiment, the half-wave plates would not be needed for adjusting power in each of the laser beamlets.

Figure 4:
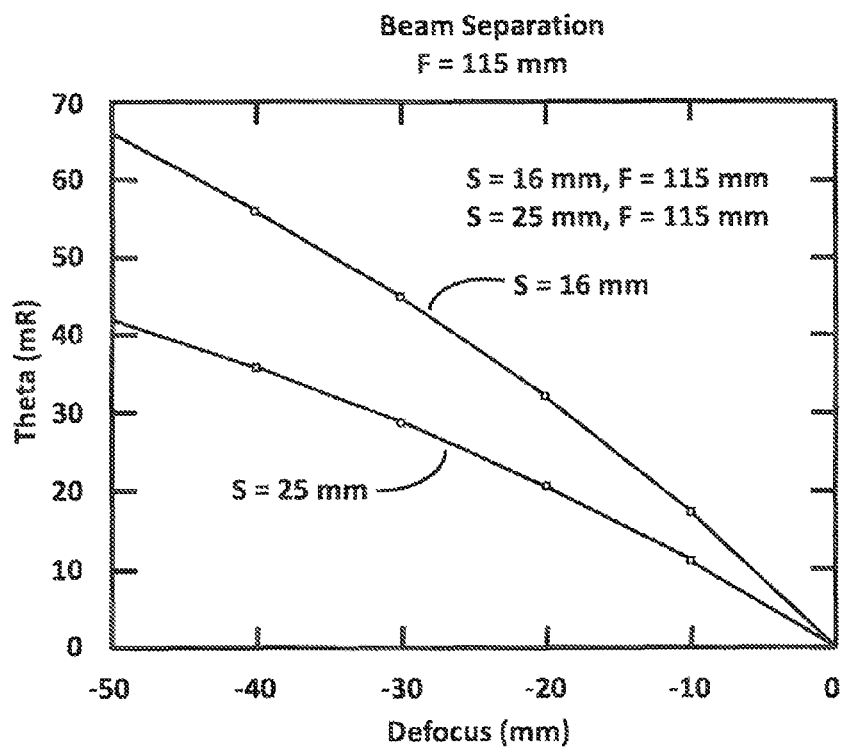
FIG. 4 is a graph of the angular separation of laser beams emerging from the pointing control optics wedges.

FIG. 3 is an equation showing the mathematical relationship between the pointing angle and the optical configuration of the pointing control module prisms 21A-D. FIG. 4 summarizes the calculation of the angular separation Θ for beams emerging from the prism wedges 21A-D (pointing control) for two different beam separation values (s=16 mm, and s=25 mm), using the equation found in FIG. 3. For both cases, the absolute value of the focal length of the negative lens 22 is 115 mm. In the equation s is the transverse spacing between the four beamlets output from lenses 19A,B, 20A,B as they enter the pointing control prism wedges 21A-D. X is the longitudinal distance from a prism's position and the position that yields a full angle separation of Zero degrees. When x is equal to zero, the four beamlets emerge from the pointing control prism wedges 21A-D fully parallel. This is the position that directs each of the four beamlets towards the virtual focal point of the negative lens 22.

Due to the fact that the configuration of the pointing control prism wedges 21A-D requires passing a convergent light beam through a thin prism, each beamlet exiting the prism wedges may have its wavefront distorted by aberrations known as astigmatism and coma. If needed, this effect can be mediated by applying certain shape corrections to the prism faces, or to lens elements, 19A,B, 20A,B and 22 of divergence control 32. More specifically, these shape corrections can be defined by changing the shape of the concave surface on lens 22 from a spherical surface, to an aspheric surface.

Thin film polarizers, such as 15 and 17, used for beam splitting are known in the art, polarizer is an optical filter that passes light of a specific polarization and blocks waves of other polarizations, It can convert a beam of light of undefined or mixed polarization into a beam with well-defined polarization. The common types of polarizers are linear polarizers and circular polarizers. Thin film polarizers are typically glass substrates on which a special optical coating is applied. Interference effects in the film cause them to act as beam splitting polarizers. They arc inexpensive and provide two beams that are about equally well polarized. Beam-splitting polarizers split an incident beam into two beams of differing linear polarization. For an ideal polarizing beam splitter these would be fully polarized, with orthogonal polarizations. For many common beam-splitting polarizers, however, only one of the two output beams is fully polarized. The other contains a mixture of polarization states. Beam splitting polarizers do not need to absorb and dissipate the energy of the rejected polarization state, and so they are more suitable for use with high intensity beams such as laser light.

Half wave plates, such as 13 and 16, are also known in the art. Half-wave plates retard one polarization of a laser beam by half a wavelength, or 180 degrees. This type of half wave plate changes the polarization direction of linear polarized light. Wave plates in general as well as polarizers can be described using the Jones matrix formalism, which uses a vector to represent the polarization state of light and a matrix to represent the linear transformation of a wave plate or polarizer.

FIG. 4 is a graph of the angular separation of laser beams emerging from the pointing control optics wedges 21A-D. The two traces on the graph are made using the equation of FIG. 2, which has been previously described, and shows the angular separation Θ (theta) for beams emerging from the pointing control module wedges 21A-D for two different beam separation values (s=16 mm, and s=25 mm). For both cases, the absolute value of the focal length of the negative lens was 115 mm.

Figure 5:
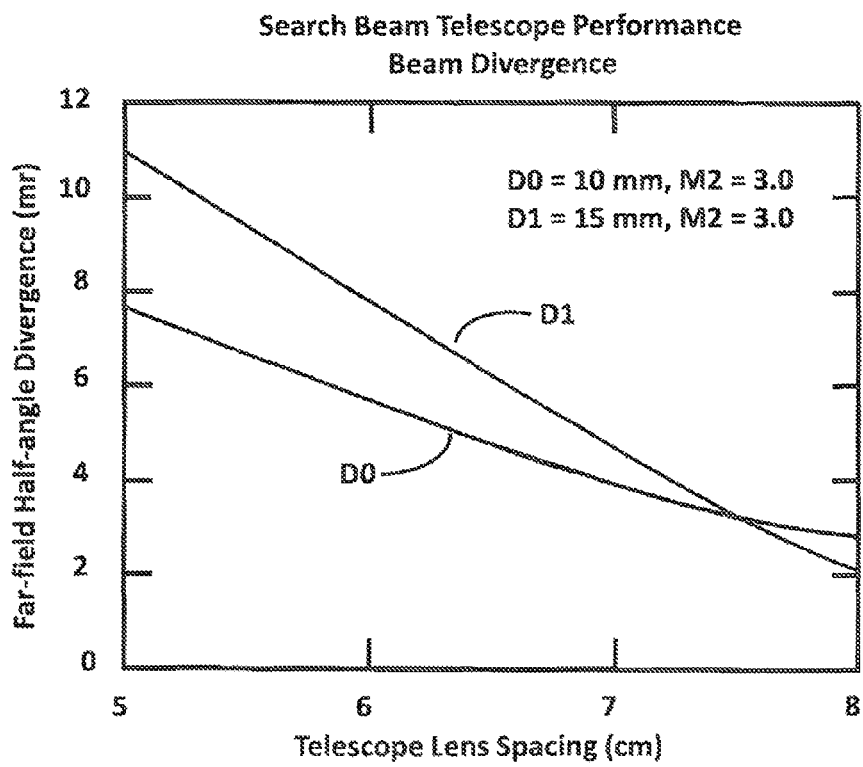
FIG. 5 is a graph of laser beam divergence versus telescope spacing of the divergence control optics lenses.

FIG. 5 is a graph of laser beam divergence plotted as a function of spacing between the divergence control 32 lenses 19A-B, 20A-B and lens 22. More particularly, FIG. 5 shows the far-field divergence of the four output beamlets plotted as a function of the telescope spacing between lenses 19A-B, 20A-B and 22, upon exiting output lens 22. The horizontal axis represents the distance, measured along the path of propagation, between lenses 19A,B and 20A,B and lens 22. The vertical axis is the far-field, half-angle divergence, measured in milli-radians. The calculation is performed with two different input beamlet diameters (D0=10 mm and D1=15 mm) output from beam splitter 33 and incident on the input of divergence control 32 lenses 19A-B, 20A-B. In both cases, a beam quality factor, as quantified by the conventional parameter known in the art as $M^2$, and $M^2=3.0$ is utilized. The parameter known as $M^2$ is defined in the commonly known journal article by A Siegman. A. E. Siegman, New Developments in Laser Resonators, SPIE Vol. 1224 Optical Resonators (1990). The present analysis was done with a telescope in which the focal length of the positive lenses 19A-B, 20A-B is 200 mm and the focal length of the common negative lens 22 is −115 mm.

FIG. 6 shows a representative pattern of the four laser beamlets output from the beam splitting and shaping system of the present invention before any adjustments are made.

Figure 7:
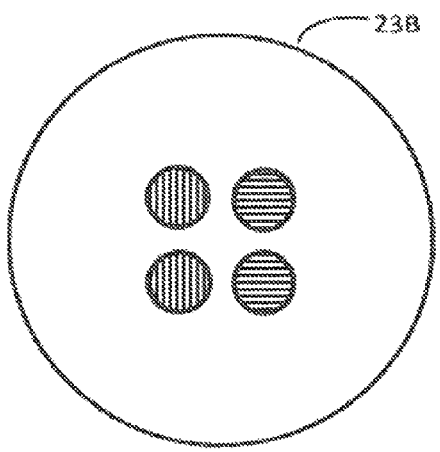
FIG. 7 shows a pattern of the four laser beams output from the beam splitting and shaping system of the present invention after the four laser beams are adjusted by the pointing control optics wedges.

FIG. 7 shows a pattern of the four laser beamlets output from the beam splitting and shaping system of the present invention after the four laser beamlets are adjusted by the pointing control optics 21A-D so that the beamlets are closer together to each other.

Figure 8:
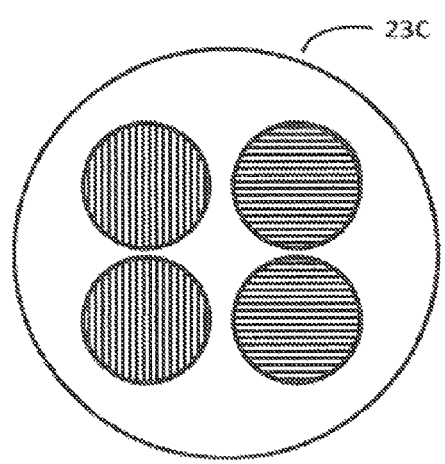
FIG. 8 shows a pattern of the four laser beams output from the beam splitting and shaping system of the present invention after the four laser beams are adjusted by the divergence control optics lenses.
Figure 9:
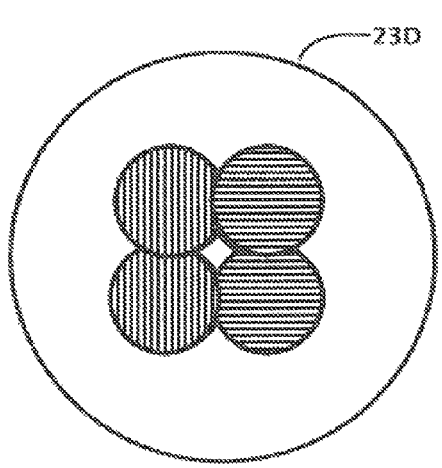
FIG. 9 shows a pattern of the four laser beams output from the beam splitting and shaping system of the present invention after the four laser beams are adjusted by both the divergence control optics lenses and the pointing control optics wedges to form an overlapping pattern that creates a flat-top profile.

FIG. 8 shows a pattern of the four laser beamlets output from the beam splitting and shaping system of the present invention after the four laser beamlets are adjusted by the divergence control optics 32 to have a larger diameter.

FIG. 9 shows a pattern of the four laser beamlets output from the beam splitting and shaping system of the present invention after the four laser beamlets are adjusted by the divergence control optics 32 for diameter and by the pointing control optics 21A-D to form an overlapping pattern that creates a generally rectangular, flat-top profile. A small space has deliberately been left in the middle only for the sake of understanding, and the four beamlets can be adjusted so that there is no small space. As previously described, half-wave plate 13 acts as a power control, that when rotated azimuthally, controls the relative fraction of the power of input laser beam 12 contained in the upper and lower beams 25 and 26. Similarly, half-wave plate 16 may also be rotated azimuthally to control the relative fraction of the power of laser beam 26 that is contained in the beams 19A,B and in beams 20A,B.

While what has been described herein is the preferred embodiment of the invention and some alternative embodiments, it will be understood by those skilled in the art that numerous changes may be made without departing from the spirit and scope of the invention.

The invention claimed is:

1. Apparatus for beam shaping a plurality of laser beams, the apparatus having an optical axis defining a direction of the laser beams traveling through and exiting the apparatus, the apparatus comprising:
    means for adjusting the angular divergence of each of the plurality of laser beams with respect to the optical axis; and
    means for pointing each of the plurality of laser beams so they are parallel to each other and to the optical axis, and to adjust the relative spacing of the laser beams with respect to each other;
    wherein the angular divergence adjusting means and the laser beam pointing means cooperate to create a combined laser beam output from the apparatus that is parallel to the optical axis and has a flat top profile.

2. The apparatus for beam shaping of claim 1 wherein angular divergence adjusting means comprises at least one negative power diverging lens and at least one positive power converging lens that cooperatively act as a variable power telescope, and divergence of the plurality of laser beams is controlled by changing the spacing between the negative power diverging lens and the positive power converging lens.

3. The apparatus for beam shaping of claim 2 wherein the laser beam pointing means comprises optical wedges that are positioned between the negative power diverging lens and the positive power converging lens, and pointing of the laser beams is accomplished by changing the position of the pointing means between the negative power diverging lens and the positive power converging lens.

4. The apparatus for beam shaping of claim 3 further comprising beam splitting means for splitting a single laser beam into the plurality of laser beams.

5. The apparatus for beam shaping of claim 4 further comprising means for controlling the amount of power in each of the plurality of laser beams so that the power in each of the plural laser beams is equal.

6. The apparatus for beam shaping of claim 1 further comprising beam splitting means for splitting a single laser beam into the plurality of laser beams.

7. The apparatus for beam shaping of claim 6 wherein the beam splitting means comprises a first beam splitter that splits the single laser beam into a first laser beam and a second laser beam in a first orientation, and a second beam splitter that splits the first laser beam into a third laser beam and a fourth laser beam and splits the second laser beam into a fifth laser beam and a sixth laser beam, the third through sixth laser beams being of at an orientation that is orthogonal to the orientation of the first and second laser beams.

8. The apparatus for beam shaping of claim 7 further comprising means for controlling the amount of power in each of the third through sixth laser beams so that the power in each beam is equal.

9. The apparatus for beam shaping of claim 8 wherein the means for controlling the amount of power in each of the third through sixth laser beams output from the beam shaping apparatus comprises:
    a first half wave plate through which the single laser beam passes before passing through the first beam splitter in order to control the amount of power of the single laser beam that is in each of the first laser beam and the second laser beam that are output from the first beam splitter; and
    a second half wave plate through which the first laser beam and the second laser beam pass before passing through the second beam splitter in order to control the amount of power of the first laser beam that is in each of the third laser beam and the fourth laser beam that are output from the second beam splitter, and the amount of power of the second laser beam that is in each of the fifth laser beam and the sixth laser beam that are output from the second beam splitter.

10. The apparatus for beam shaping of claim 1 wherein the laser beam pointing means comprises optical wedges and pointing of the plural laser beams is accomplished by changing the position of the laser beam pointing means with respect to the laser beam angular divergence adjusting means.

11. The apparatus for beam shaping of claim 1 wherein both the first beam splitter and the second beam splitter each comprise a mirror and a polarizer.

12. A method for beam shaping a plurality of laser beams, the method comprising the steps of:
    adjusting the angular divergence of each of the plurality of laser beams with respect to an optical axis; and pointing each of the plurality of laser beams so they are parallel to each other and to the optical axis, and adjusting the relative spacing of the laser beams with respect to each other;

wherein the combination of adjusting the angular divergence and pointing each of the plurality of laser beams so they are parallel to each other create a combined laser beam output that is parallel to the optical axis and has a flat top profile.

13. The method for beam shaping a plurality of laser beams of claim 12 wherein the step of adjusting the angular divergence of each of the plurality of laser beams with respect to an optical axis comprises the step of passing the plurality of laser beams through optical lenses that act as a variable power telescope.

14. The method for beam shaping a plurality of laser beams of claim 13 wherein the step of pointing each of the plurality of laser beams so they are parallel to each other and to the optical axis comprises the step of passing each of the plurality of laser beams through an optical wedge to change the direction that each laser beams travels so that all of the laser beams are parallel to each other and to change the relative spacing between all the laser beams.

15. The method for beam shaping a plurality of laser beams of claim 14 further comprising the steps of:

creating the plurality of laser beams from a single laser beam by first splitting the single laser beam into a first laser beam and a second laser beam, splitting the first laser beam into a third laser beam and a fourth laser beam, and splitting the second laser beam into a fifth laser beam and a sixth laser beam.

16. The method for beam shaping a plurality of laser beams of claim 15 further comprising the step of controlling the power in each of the third through sixth laser beams so that their power is equal.

17. The method for beam shaping a plurality of laser beams of claim 12 further comprising the steps of:

creating the plurality of laser beams from a single laser beam by first splitting the single laser beam into a first laser beam and a second laser beam, splitting the first laser beam into a third laser beam and a fourth laser beam, and splitting the second laser beam into a fifth laser beam and a sixth laser beam.

18. The method for beam shaping a plurality of laser beams of claim 12 wherein the step of pointing each of the plurality of laser beams so they are parallel to each other and to the optical axis comprises the step of passing each of the plurality of laser beams through an optical wedge. to change the direction that each laser beams travels so that all of the laser beams are parallel to each other and to change the relative spacing between all the laser beams.

19. The method for beam shaping a plurality of laser beams of claim 18 further comprising the steps of:

creating the plurality of laser beams from a single laser beam by first splitting the single laser beam into a first laser beam and a second laser beam, splitting the first laser beam into a third laser beam and a fourth laser beam, and splitting the second laser beam into a fifth laser beam and a sixth laser beam.

20. The method for beam shaping a plurality of laser beams of claim 12 further comprising the step of controlling the power in each of the third through sixth laser beams so that their power is equal.

21. Apparatus for beam shaping a plurality of laser beams, the apparatus having an optical axis defining a direction of the laser beams traveling through and exiting the apparatus, the apparatus comprising;

means for adjusting the angular divergence of each of the plurality of laser beams with respect to the optical axis consisting of at least one negative power diverging lens and at least one positive power converging lens that cooperatively act as a variable power telescope, and divergence of the plurality of laser beams is controlled by changing the spacing between the negative power diverging lens and the positive power converging lens; and means for pointing each of the plurality of laser beams so they are parallel to each other and to the optical axis, and to adjust the relative spacing of the laser beams with respect to each other;

wherein the angular divergence adjusting means and the laser beam pointing means cooperate to create a combined laser beam output from the apparatus that is parallel to the optical axis and has a flat top profile.

* * * * *